(12) United States Patent
Sleigh et al.

(10) Patent No.: US 10,785,995 B2
(45) Date of Patent: Sep. 29, 2020

(54) MULTI-COMPONENT FOOD PRODUCT

(71) Applicant: Mars, Incorporated, McLean, VA (US)

(72) Inventors: Robert Sleigh, Rose Bay (AU); Brad William Woonton, Albury (AU); Estelle Lifran, Hanches (FR); Tanoj Singh, Tameit (AU); Aung Htoon, Kingsford (AU); Susan Finnegan, Wodonga (AU)

(73) Assignee: MARS, Incorporated, McLean, VA (US)

( * ) Notice: Subject to any disclaimer, the term of this patent is extended or adjusted under 35 U.S.C. 154(b) by 467 days.

(21) Appl. No.: 15/072,965

(22) Filed: Mar. 17, 2016

(65) Prior Publication Data

US 2016/0198738 A1 Jul. 14, 2016

Related U.S. Application Data

(62) Division of application No. 13/521,911, filed as application No. PCT/AU2011/000030 on Jan. 12, 2011, now abandoned.

(30) Foreign Application Priority Data

Jan. 12, 2010 (AU) .............................. 2010900089

(51) Int. Cl.
*A23K 20/20* (2016.01)
*A23K 20/174* (2016.01)
(Continued)

(52) U.S. Cl.
CPC ............ *A23K 20/20* (2016.05); *A23K 20/174* (2016.05); *A23K 20/24* (2016.05); *A23K 20/26* (2016.05);
(Continued)

(58) Field of Classification Search
CPC ....................................................... A23K 20/20
See application file for complete search history.

(56) References Cited

U.S. PATENT DOCUMENTS 3,882,257 A 5/1975 Cagle
4,234,608 A 11/1980 Linehan
(Continued)

FOREIGN PATENT DOCUMENTS

JP 2006246900 9/2006

OTHER PUBLICATIONS

Kanner (New York, May 4, 1992, pp. 14-16).*
(Continued)

*Primary Examiner* — Benjamin J Packard
(74) *Attorney, Agent, or Firm* — MARS, Incorporated (57) ABSTRACT

Embodiments herein related to multi-component packaged food products which have been thermally processed to achieve commercial sterility in a package, including at least a first component and a second component in contact with (e.g., immersed in) the first component, wherein said first component is comprised of a substantially water-based, liquid, pasty or gelled food such as sauce, gel, gravy, jus or the like, and wherein the second component consists of one or more relatively hard, manufactured pieces that substantially retain their initial shape and hard or crunchy textural functionality for at least an expected shelf-life of the product whilst exposed to the moisture content of the first component.

19 Claims, 4 Drawing Sheets

| Salt | Structure |
|---|---|
| Apatite | $(Ca,w)_{10}(PO_4,x)_6(OH,y)_2$ |
| Carbonated apatite | $(Ca_{10-x}Na_x)(PO_4)_{6-x}(CO_3)_x(OH)_2$ |
| Fluor-hydroxyapatite | $(Ca_{10})(PO_4)_6(F,OH)_2$ |
| w = Na, Mg, K, Sr | x = $CO_3$ or $HPO_4$ |
| y = Cl or F | z = $P_2O_7$ or $CO_3$ |

(51) Int. Cl.
| | |
|---|---|
| *A23K 40/20* | (2016.01) |
| *A23K 50/42* | (2016.01) |
| *A23K 50/48* | (2016.01) |
| *A23K 20/26* | (2016.01) |
| *A23K 20/24* | (2016.01) |
| *A23K 40/10* | (2016.01) |
| *A23L 3/10* | (2006.01) |

(52) U.S. Cl.
CPC .............. *A23K 40/10* (2016.05); *A23K 40/20* (2016.05); *A23K 50/42* (2016.05); *A23K 50/48* (2016.05); *A23L 3/10* (2013.01)

(56) References Cited

U.S. PATENT DOCUMENTS

| | | | |
|---|---|---|---|
| 4,265,867 | A | 5/1981 | Caswell et al. |
| 5,456,933 | A | 10/1995 | Lee |
| 5,820,903 | A * | 10/1998 | Fleury .................... A23C 9/133 426/34 |
| 6,117,477 | A | 9/2000 | Paluch et al. |
| 6,517,877 | B2 | 2/2003 | Gannon |
| 8,496,955 | B2 | 7/2013 | Cooper et al. |
| 2004/0053245 | A1 | 3/2004 | Tang et al. |
| 2005/0095338 | A1 | 5/2005 | Fernandes et al. |
| 2006/0013921 | A1 | 1/2006 | Kasahara et al. |
| 2008/0175904 | A1 | 7/2008 | Mathiesen et al. |
| 2012/0156288 | A1 | 6/2012 | Lakkis et al. |

OTHER PUBLICATIONS

Kanner (New York Mag, May 4, 1992, pp. 14-16).*
Douglas Laboratories, Inc., "Calcium Microcrystalline Hydroxyapatite", http://www.douglaslabs.com/pdf/pds/83018.pdf>published on Oct. 31, 2006 as per Wayback Machine, retrieved on Feb. 17, 2011.
Merrick Wingaling, "Dog Food Analysis", Retrieved from the Internet: URL:http://www.dogfoodanalysis.com/dog_food_reviews/showproduct.php/product/605>, Apr. 21, 2006 (retrieved on Aug. 25, 2014), 1-2.
Anonymus, "Mango Mint Gum", Database GNPD Mintel, Jun. 2008, XP002775659, 2 pages.
Ferraz, et al., "Hydroxyapatite nanoparticles: A review of preparation methodologies", Journal of Applied Biomaterials, John Wiley & Sons, Inc. New York, NY, US, vol. 2, Jan. 2004, p. 74-80, XP002468051.
Moreno, et al., "Preparation and Solubility of Hydroxyapatite", Journal of Research of the National Bureau of Standards Section A: Physics and Chemistry, vol. 72A, No. 6, Nov. 1, 1968, p. 773, XP055157050.
Raynaud, et al., "Calcium Phosphate Apatites with Variable Ca/P Atomic Ratio I. Synthesis, Characterisation and Thermal Stability of Powders", Biomateri, Elsevier Science Publishers BV, Barking, GB, vol. 23, No. 4, Feb. 15, 2002, pp. 1065-1072, XP004348124.

* cited by examiner

Figure 1

| Salt | Structure |
|---|---|
| Apatite | $(Ca,w)_{10}(PO_4,x)_6(OH,y)_2$ |
| Carbonated apatite | $(Ca_{10-x}Na_x)(PO_4)_{6-x}(CO_3)_x(OH)_2$ |
| Fluor-hydroxyapatite | $(Ca_{10})(PO_4)_6(F,OH)_2$ | w = Na, Mg, K, Sr      x = $CO_3$ or $HPO_4$ y = Cl or F      z = $P_2O_7$ or $CO_3$

MULTI-COMPONENT FOOD PRODUCT

CROSS-REFERENCE TO RELATED APPLICATIONS

This is a divisional application of U.S. patent application Ser. No. 13/521,911, which is a national phase application under 35 USC § 371 of PCT Application No. PCT/AU2011/000030, which claims the benefit of foreign priority to Australian Patent Application No. 2010900089, filed Jan. 12, 2010, the teaching and contents of which are both hereby incorporated by reference.

FIELD

The subject matter herein relates to the field of commercial pet food manufacture. In particular, the subject matter herein relates to an improved multi-component wet packaged pet food product and a method for manufacturing a 'non-wet' component for use in multi-component wet packaged pet food products.

BACKGROUND

Multi-component wet packaged food products have been marketed in most major markets for decades, and are well known in particular also in the pet food manufacturing sector.

In the context of the present patent specification, the term 'multi-component' is used to denote a product having a wet phase, or first food component, comprising as a major constituent water (but not excluding other humectants) in which are dissolved or suspended other edible substances, which is characterised by a high water activity of typically above 85 to 90 and which at ambient temperature will typically have a liquid, viscous or gelatinised consistency. Typical representatives of such wet phase components include gravies, jus, gels, sauces, etc. The multi-component product will also incorporate a second (or more) solid phase component that has separate and distinct physical characteristics from the wet phase component and when immersed or otherwise in contact with the wet phase first component will keep to a substantial extent its shape.

A further characteristic of 'wet' packaged foods is that they are made shelf stable by heat treatment, e.g. retorted, canned, pouched or bottled foods, or hot-packed aseptically sealed products.

As an example, there are known canned pet food products in which 'solid' constituents such as rice, real or 'artificial meat' (i.e. meat analogue) chunks and vegetable pieces are suspended in a syrupy (starchy) gravy, so that at least two distinct textures are present at the time of consumption by the animal, whereby the shape-stable, distinct components remain separable from the gravy.

A consistent feature of these products is that the solid components tend to be relatively soft (i.e., chewy or resilient), whether they be meat or poultry chunks, fish chunks, reformed meat chunks, vegetables, extruded cereal-based or protein-based chunks and even pieces of vegetables which are typically 'hard' in raw state, such as carrots. This is almost inevitable, given the heat conditions applied in making the food commercially sterile in the presence of water. Softening of the otherwise solid components also follows during shelf-life storage in that these 'take up' moisture from the surrounding wet phase gel, gravy or the like. For the vast majority of these products, this is not necessarily a problem, since such solid phase components are likely to be reasonably palatable, and textural 'shortcomings' may not be too problematic, in particular upon consumption by a mammal pet.

However, there is an increasing trend to design food products, including pet food, that carry specific health benefits by inclusion of 'active' ingredients, such as nutraceutical or pharmaceutical actives, vitamins, minerals, amongst others. Unfortunately, many existing multi-component foods tend not to be useful for carrying and protecting many of said active ingredients during commercial sterilisation heat treatments, due to their relatively high moisture levels. One way in which this problem has been sought to be addressed in the past is by way of micro-encapsulation of active substances in heat and/or moisture resistant casings prior to embedding or infusion into manufactured meat analogue chunks or suspension in the wet phase component.

Another aspect that is finding increasing attention in the pet food industry in particular, is a requirement for product differentiation by having multi-component foods which incorporate distinct textures components, wherein a challenge remains in creating a packaged wet product with crunchy or crispy textural components that remain in such textural state within a liquid-based matrix during the shelf-life of the product.

Accordingly, it is one object to provide a multi-component wet packaged food product, and a component therefor, that includes a component able to remain shape-stable and relatively 'hard' or crunchy, to provide a point of textural variety, during shelf-life of the product.

In another object, it would be beneficial for the relatively hard or crunchy component to provide a suitable substrate for carrying substances to provide functional benefits to the consumer of the food product.

Yet a further object is to provide a method of manufacturing a comestible, relatively hard or crunchy food component that will remain in such state when used in the manufacture of heat-treated, packaged wet food products, in particular pet food products.

BRIEF DESCRIPTION

In one overarching aspect a multi-component packaged food product is provided. The multi-component packaged food product has been thermally processed to achieve commercial sterility in a package, including at least a first component and a second component in contact with (e.g., immersed in) the first component, wherein said first component is comprised of a substantially water-based, liquid, pasty or gelled food such as sauce, gel, gravy, jus or the like, and wherein the second component consists of one or more relatively hard, manufactured pieces that substantially retain their initial shape and hard or crunchy textural functionality for at least an expected shelf-life of the product whilst exposed to the moisture content of the first component.

According to a more specific aspect, there is provided a multi-component packaged food product which has been thermally processed to achieve commercial sterility in said package, including at least first and second components, wherein said first component consists of a wet phase comprising water and other edible substances and having a water activity of above 85 and which at ambient temperature will typically have a liquid, viscous or gelled consistency, and wherein said second component comprises solid phase pieces at least partially surrounded by the first component and which have separate and distinct physical characteristics from the wet phase component, characterised by the solid phase pieces comprising a manufactured matrix of inorganic but edible mineral salts formed into a shape-stable object exhibiting a bulk water activity value of 0.75 or below prior to thermal processing of the packaged food product. In particular, the food product is a pet food product.

The stable, low water activity of the solid phase pieces has advantages in that these inclusions in a packaged wet pet food product are stable in the food product upon storage, and promote heat stability during thermal processing of the multi-component food.

An advantage of such multi-component wet food product for pets is that the second component will maintain a relatively hard and crunchy texture throughout the normal shelf-life of the food product, providing a different texture to that normally associated with 'chunks in sauce' style products, which mammal pets tend to appreciate. This textural-stability within an aqueous environment which the wet phase component represents may be leveraged to provide functional advantages, e.g. the use of particular shape profiles of the hard component pieces to promote good dental hygiene in pet animals.

Preferably, prior to thermal processing, the difference in water activity between said first component and said second component pieces is in the range 0.10 to 0.20, advantageously the gap is 0.15, the matrix of inorganic mineral salts ensuring that the pieces will keep to a substantial extent their distinct shape when immersed or otherwise in contact with the wet phase first component. Preferably, said solid component pieces have a bulk water activity of 0.70 or below prior to thermal processing, said first (i.e. wet phase) component has a water activity of 0.9 or above.

Preferably, the second component pieces comprise a matrix of calcium mineral salts, most preferably a matrix of calcium hydroxyapatite ('CHA'). This provides a relatively high degree of hardness (or crunchiness) to the pieces which will be maintained following thermal processing in a relatively 'wet' environment. It is believed that CHA has previously not been used in the manufacture of comestible foods, although it has been used in numerous other applications, as noted below.

Advantageously, the hard CHA matrix pieces will have an initial moisture content of less than 10.0% w/w prior to incorporation into the wet phase first component by immersion in it.

It should be noted that palatability of the relatively hard CHA matrix pieces is also an important aspect in the context of multi-component pet foods. Accordingly, palatant substances may advantageously be incorporated into the CHA matrix or onto the exterior surface of the CHA matrix pieces, such as starches, sugars and generally palatant substances typically employed in the pet food manufacturing sector.

It has been surprisingly found that CHA matrix pieces formulated and manufactured by dry blending of tri-calcium phosphate (TSP), calcium hydroxide (CH) and calcium sulphate (CS), subsequent addition of water and appropriate titration and neutralization (e.g., using a food-grade acid such as diluted phosphoric acid) to an about neutral pH value, followed by optional conditioning of the resulting slurry prior to drying and form-shaping, will yield pieces which from a palatability point of view are better than the case where other precursor substances are used in manufacturing the CHA. Accordingly, the above manufacturing process represents a further aspect of the subject matter herein.

A preferred ratio of TSP:CH:CS is preferably in the range of 2:1:1, although this may be varied.

In yet a further aspect, functional ingredients are incorporated into the CHA matrix pieces prior to or after the piece form-shaping step. These ingredients may include one or more materials selected from the group comprising nutraceutical actives, pharmaceutical actives, dentifrices and chelating agents.

Preferably, the second component pieces are formed by a process of compression, in particular compression tabletting. This technique, in particular when using a CHA matrix formulation as previously described, provides a highly form or shape stable food component which retains shape and low water activity when in contact with (or immersed in) wet phase components typically employed in the pet food industry, even after undergoing cooking processes designed to produce commercial sterility.

It will be appreciated by those skilled in the art that the subject matter herein is of wide application in the field of commercial packaged foods, in particular those intended for consumption by pets. Also, the subject matter herein may be applied to a number of food product formats, including chunks in gel, chunks in sauce, chunks in loaf, pieces in gravy, pieces in gel and pieces in loaf (wherein the piece can be any food piece). It would also be clear that the product may be packaged in any suitable food container, including steel cans, flexible aluminium or plastic trays, flexible pouches or sachets, glass bottles or jars, etc. These aspects are known to the multi-component food formulator.

It would also be clear to the skilled addressee that the first component may be mingled or mixed with the second component either before or after thermal processing of the second component, or mixed and mingled to be thermally processed together.

The subject matter also does not preclude the presence of third, fourth or more other components. In other words, the subject matter herein also foresees incorporation of solid phase pieces comprising a manufactured matrix of inorganic but edible mineral salts formed into a shape-stable object exhibiting a bulk water activity value of 0.75 or below prior to thermal processing of the packaged food product, into an otherwise 'standard' packaged wet food product having analogue meat pieces, meat chunks or other solids, as currently commercially available.

In the following, a detailed description will be provided on how to manufacture solid phase components in accordance with one of the aspects, for subsequent use in a multi-component wet packaged food product.

DETAILED DESCRIPTION

Multi-component wet food products are known per se, and will thus not be described further. Relevantly, different aspects of the subject matter herein comprise (i) how to manufacture and (ii) provide hard, manufactured pieces that substantially retain their initial shape and hard or crunchy textural functionality for at least an expected shelf-life of such multi-component food product whilst exposed to the moisture content of the liquid, pasty or gelled, high water activity food component, as well as (iii) a multi-component wet food product incorporating such hard pieces. Therefore, the following description will be limited to these aspects.

There are numerous mineral compounds that may be used to manufacture a relatively hard and stable food piece for inclusion in a multi-component food product described herein. However, and in particular, calcium salts are preferentially employed, both for their stability and inherent texture, as well as for their contribution to dietary calcium.

Calcium hydroxyapatite [CHA:$Ca_{10}(PO_4)_6(OH)_2$] has been identified as a preferred matrix material which can be used for such purpose. Consideration of the following factors led to such appreciation.

CHA is a major mineral component in animal and human bodies, especially in "load-bearing" tissues such as bone and teeth. For example, in a typical cortical bone, which is composed of: 22 wt % organic matrix, 69 wt % mineral, 9 wt % water, the major sub-phase of the mineral component consists of sub-microscopic crystals of an apatite of calcium and phosphate. CHA is otherwise also an important inorganic material in biology and chemistry. Biological apatites, which are the inorganic constituents of bone, tooth enamel and dentin, however, are typically very variable in their composition and morphology, and contain different impurities including: $Mg^{2+}$, $K^+$, $Na^+$, $CO_3^{2-}$, $HPO_4^{2-}$, $Cl^-$, $F^-$, and others. In general, these impure biological apatites are designated as calcium deficient or non-stoichiometric apatites.

Figure 1:
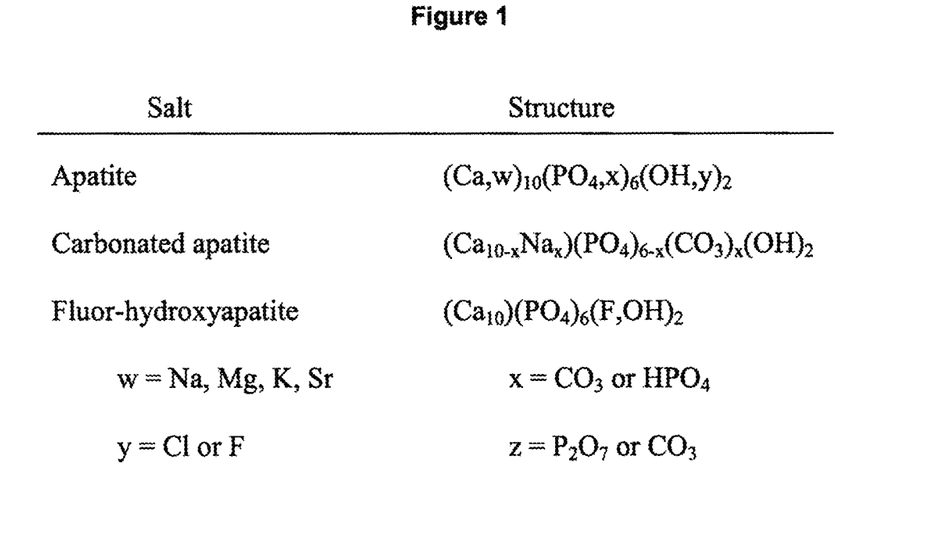
FIG. 1 shows the chemical structure of apatite in enamel, dentine and bone.

FIG. 1 illustrates details on structure of different biological apatites. Synthetic CHA, on the other hand, is also frequently used in biomineralization and biomaterial studies. The composition, physicochemical properties, crystal size and morphology of synthetic apatites tend to be sensitive to preparative conditions. Common impurity phases in synthetic apatites prepared by precipitation from supersaturated aqueous solutions are calcium phosphate compounds such as amorphous calcium phosphates (ACP) with variable compositions of $Ca_3(PO_4)_{2-2x}(HPO_4)_{3x}$.nH2O, octacalcium phosphate (OCP), $Ca_8(HPO_4)_2(PO_4)_4.5H_2O$, and calcium hydrogen phosphate dihydrate (DCPD), $CaHPO_4.2H_2O$. In addition, the incorporation of various ions as trace impurities (hydrogen phosphate, carbonate, silicate ions, etc.) is very difficult to prevent in any preparative procedure of CHA.

The most common reactions used for preparation of CHA in the literature are:

Reaction 1

$3CaHPO_4$ + $2CaCO_3$ ⟶ $Ca_5(PO_4)_3OH$ + $2CO_2$.
DCP          CC                      HAp Reaction 2

$aCa(OH)_2$ + $bCa_4(PO_4)_2O$ + $cCa_3(PO_4)_2$ + $dH_2O$

↓

$Ca_{10-x}(PO_4)_{6-2x}HPO_4)_{2x}(OH)_2$

Calcium hydroxyapatite

Reaction 3

$6CaHPO_4·2H_2O$ + $4CaO$ ⟶ $Ca_{10}(PO_4)_6(OH)_2$ + $14H_2O$

Consequently, and having regard to the manufacturing process dependent shortcomings mentioned above, CHA may be used in formulating food-compatible components that may impart a different textural sensation when mingled, embedded or otherwise present in a multi-component wet food product.

Figure 2:
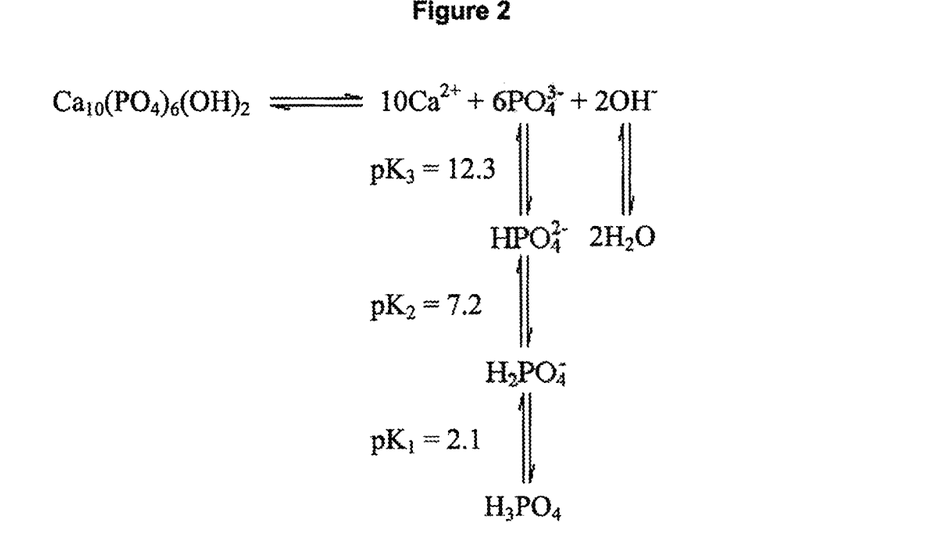
FIG. 2 shows the dissociation equilibrium equation for calcium hydroxyapatite in general terms.

In this context, one has to take account of the fact that the moisture and pH of the wet food component in which CHA-based hard food component pieces would be incorporated greatly influences the stability of the CHA material. The dissociation equilibrium equation for calcium hydroxyapatite is shown in FIG. 2.

On dissociation, hydroxyapatite produces two ions, phosphate and hydroxyl, capable of accepting protons. Hydroxyapatite is, therefore, a weak base. Phosphate is capable of accepting three protons and has three possible pK values: 12.3, 7.2 and 2.1. As the pH of the aqueous phase drops, the ratio of the concentrations of the various forms of phosphate changes as more and more phosphate is progressively protonated. Similarly, as the pH drops, hydroxyl ions are protonated and the [OH] ion concentration reduces.

Knowledge of the relationship between pH and pK allows prediction of the behaviour of the phosphate and relation of this to mineral dissolution. At near neutral pH, say pH 7.2, the ratio of mono- and di-hydrogen phosphate can be calculated, which means that when the pH of the solution is equal to the pK, the concentration of mono- and di-hydrogen phosphate is the same. Similar calculations can be applied to the other pK values but these are a long way outside the physiological values of pH which are experienced in vivo or in a food matrix.

It is interesting to calculate the ratio of phosphate ion to mono-hydrogen phosphate at near neutral pH because it is the concentration of the un-protonated phosphate, together with hydroxyl ion, which affects the dissociation of CHA.

Against this background, some key points as to the suitability of using CHA in the manufacture of a food component are summarised below:

- The dissociation constant (pK) defines the ratio of the concentrations of the dissociated ions and the undissociated acid.
- The Henderson-Hasselbach equation relates pK, pH and the ratio of salt concentration to un-dissociated acid. The buffering action of any weak acid-salt mixture is at its greatest close to the pK of the weak acid. Phosphate can accept three protons and has three possible pK values, 12.3, 7.2 and 2.1.
- In the dissociation of hydroxyapatite, it is the concentration of non-protonated phosphate and hydroxyl ions which are important. As the pH becomes more acid, more phosphate is protonated resulting in the dissolution of more mineral.
- In food, it is important to consider buffering capacity of proteins present in a food matrix. Moisture in food and its saturation with respect to calcium and phosphate and the presence of other salts/ions can greatly impact on the stability of CHA dental active material.
- Calcium phosphate-based biomaterials have been in use in medicine and dentistry for over 20 years because of their excellent biocompatibility with human tissues, e.g. dental implants, percutaneous devices, periodontal treatment, alveolar ridge augmentation, orthopedics, maxillofacial surgery, otolaryngology, and spinal surgery.

Hydroxyapatite is also currently used for fractionation and purification of a wide variety of biological molecules, such as subclasses of enzymes, antibody fragments, and nucleic acids.

Having established the suitability of using CHA in formulating a food component that may be used in a multi-component wet food product, the challenge was then to identify and provide a process for the manufacture of CHA that is physiologically acceptable and which material may then be used to provide a substrate for or mayor constituent of a texturally hard or crunchy food piece.

In accordance with one aspect, such process was devised. It comprises the steps of mixing suitable CHA-precursor ingredients, titrating with water and a suitable food-grade acid to achieve an adequately neutralised slurry, and subjecting the slurry through various conditioning, maturing and drying steps, some of which are optional, to obtain a material which can then be form-shaped into food pieces, either alone or in combination with other constituents.

Figure 3:
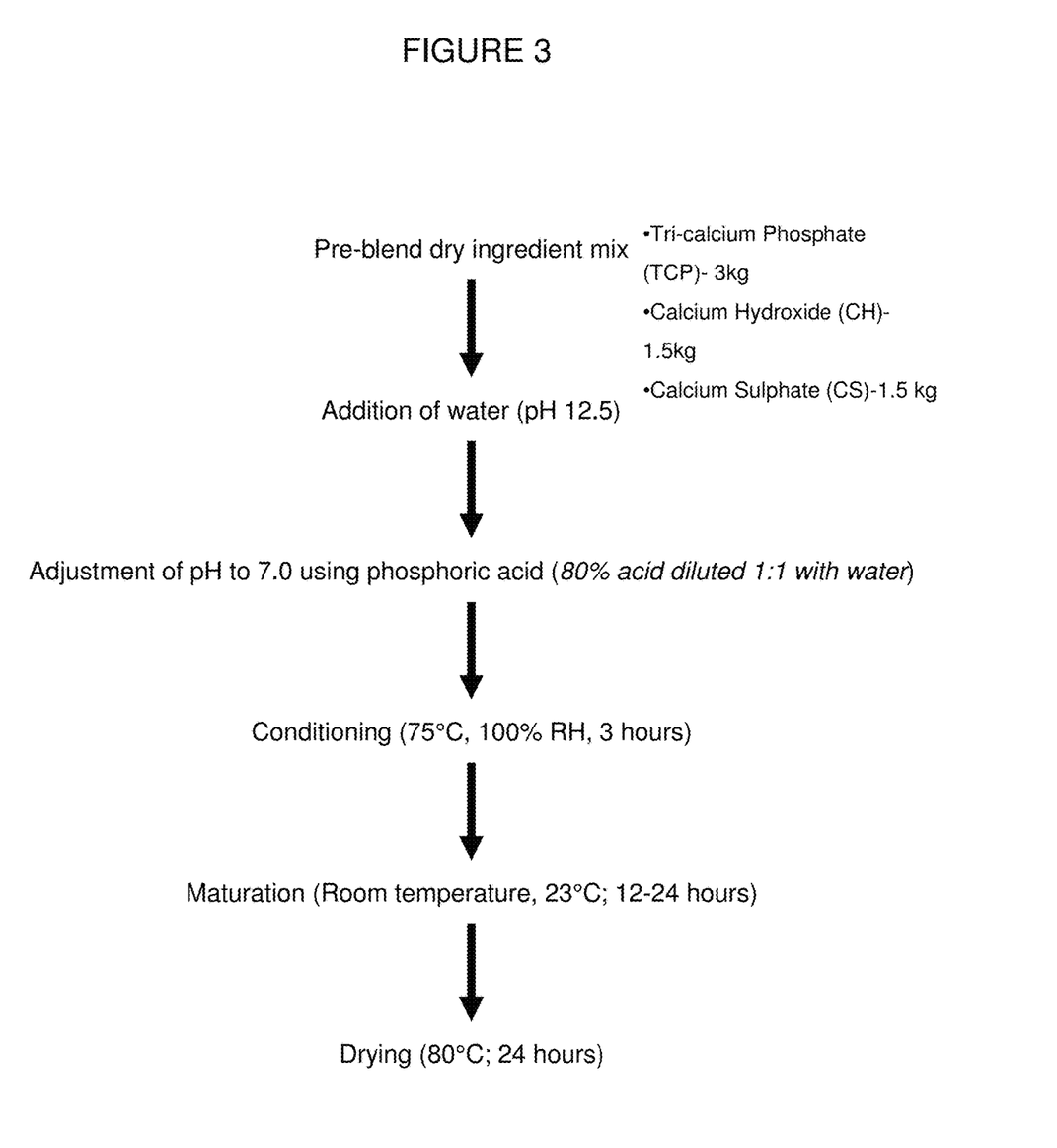
FIG. 3 shows a flow diagram of a scaled-up manufacturing process in accordance with one aspect to yield a calcium hydroxyapatite which is preferably used in formulating hard component pieces for use in a wet packaged food product.

A process flow diagram for manufacturing a preferred food-grade CHA is illustrated in FIG. 3, using exemplary process parameter values and quantities of ingredients as determined suitable from pilot scale tests.

This process involves the dry blending of (3 Kg) tricalcium phosphate (TCP), (1.5 Kg) calcium hydroxide (CH) and (1.5 Kg) calcium sulphate (CS). This is best performed using a rotary drum mixer as it was found to yield optimum mixing/blending of the dry ingredients as compared with other mixers, such as a pin-mixer. The dry blended ingredients are then placed into a Hobart mixer, and a sufficient quantity of water is added to make a thick slurry. The slurry is slowly neutralized by the addition of acid (80% phosphoric acid diluted 1:1 with water) with continuous stirring/mixing. The pH of the starting slurry was >12.0 and had a sandy/gritty texture, whereas the resulting titrated material slurry exhibits a smooth 'plaster-like' texture with a neutral pH value of around 7.0; total weight of the aqueous slurry at this stage set to 12 Kg.

The neutralized (titrated) slurry material is then subjected to an optional conditioning stage in suitable conditioning vessels. Suitable conditioning parameters are 75° C. at 100% relative humidity for three hrs. An optional maturation stage may then include resting the conditioned material at room temperature (23° C.) for no less than 12 hrs., preferably 24 hrs., before the material is fully dried at 80° C. for such time as to achieve a dry product with preferably not more than 10% w/w moisture content.

This dried CHA material can then be granulated or pulverized and subsequently form-shaped into discrete pieces.

A preferred form-shaping process resides in direct dry compression tabletting of the CHA, either alone or with a small w/w % of added constituents such as palatants and tableting aid agents (e.g., Mg Sterate) to form a water repellent though not entirely water impervious outer surface and to a compression degree sufficient to have a shape-stable object that can be handled during food product manufacturing operations without breaking up. The specific shape of the pieces is not limiting, as is the weight, although typical tablet sizes and lenticular shapes such as encountered in the pharmaceutical industry provide guidance in achieving form-stable pieces.

For CHA-matrix, hard tabletted pieces to be successfully incorporated into multi-component wet (pet) food products, whereby these maintain shape integrity and textural quality within the multi-component product, these must meet requirements for crunch and crisp wet metrics for such products in the marketplace.

To determine this, CHA tablets were manufactured using slight variations of the above general formula/recipe and compressed to different degrees to establish adequate compression values (and formulations) required for such tabletted CHA-matrix pieces to maintain adequate 'crunchiness' (or hardness) over the intended shelf-life in a multi-component wet pet food product.

Figure 4:
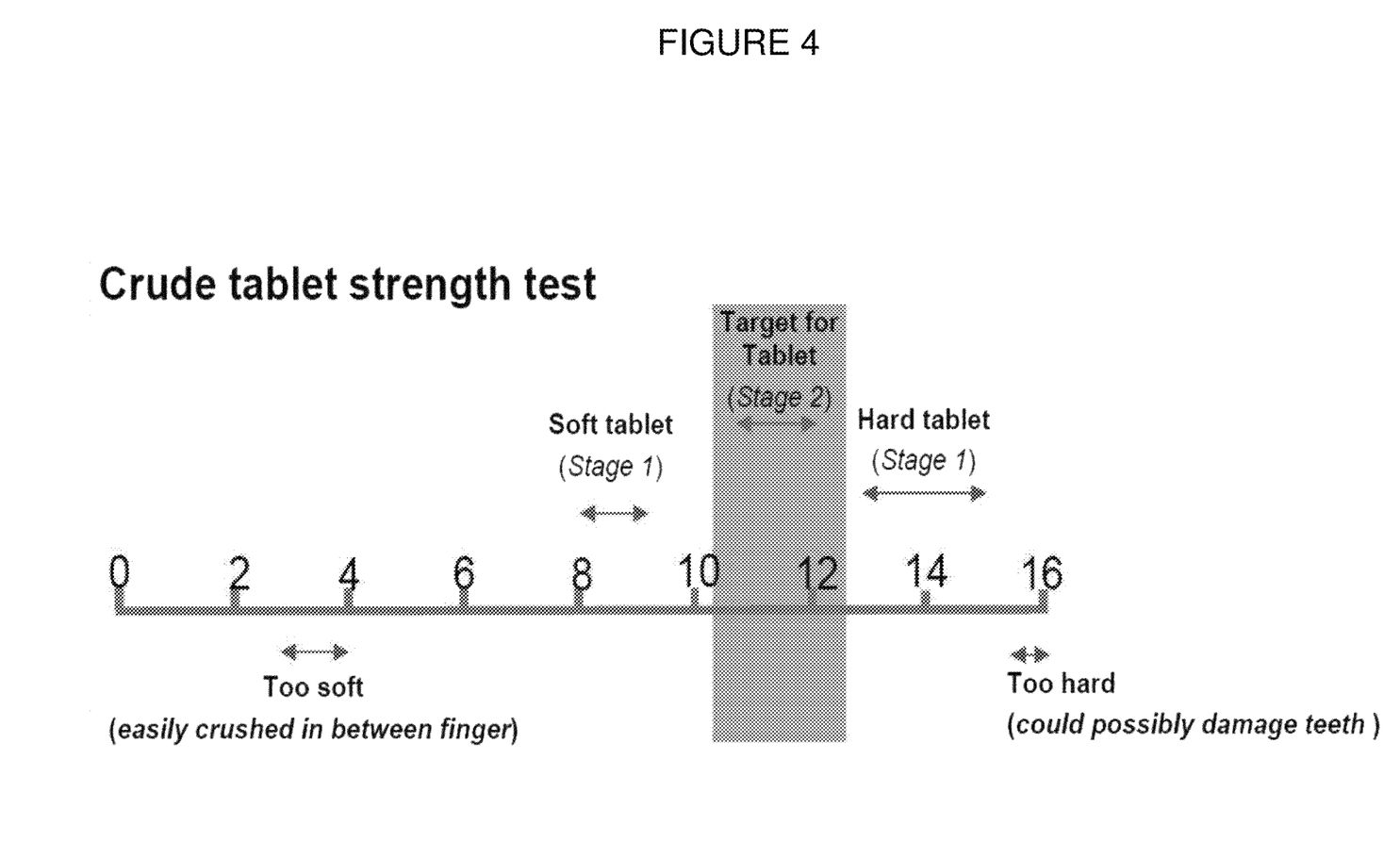
FIG. 4 shows a graph illustrating the relative hardness values of solid food component pieces in tablet form, which represent one aspect, measured using a qualitative tablet screw test, wherein the shaded area depicts the perceived hardness value for the CHA-based tablet made in accordance with that aspect.

The relative hardness of the solid pieces is tested after tabletting, prior to inclusion into the multi-component wet food product, as well as after retort processing of the multi-component food product to a degree which achieves commercial sterility. It will be appreciated that the degree of 'crunchiness' that will be present at the end or past the shelf-life will depend to some, although small degree, also on the actual water activity of the specific liquid food component in which the hard CHA-matrix pieces are immersed. Also, being a relative sensory value, it is not possible to provide a preferred formulistic or value-specific hardness, softness or crunchiness indicator. The 'softness' and 'hardness' of CHA-matrix tablets is thus better indicated on a qualitative (yet ultimately arbitrary) hardness scale, such as illustrated in FIG. 4. It would seem from tests carried out that medium relative hardness values, as depicted by the highlighted area in FIG. 4, should be aimed for when using the CHA-formulated tablets as per the subject matter herein.

CHA materials produced were typically also more suitable for tabletting when they had been dried further (towards a lower w/w % moisture content) and pre-granulated (rather than pulverised).

Figure 5:
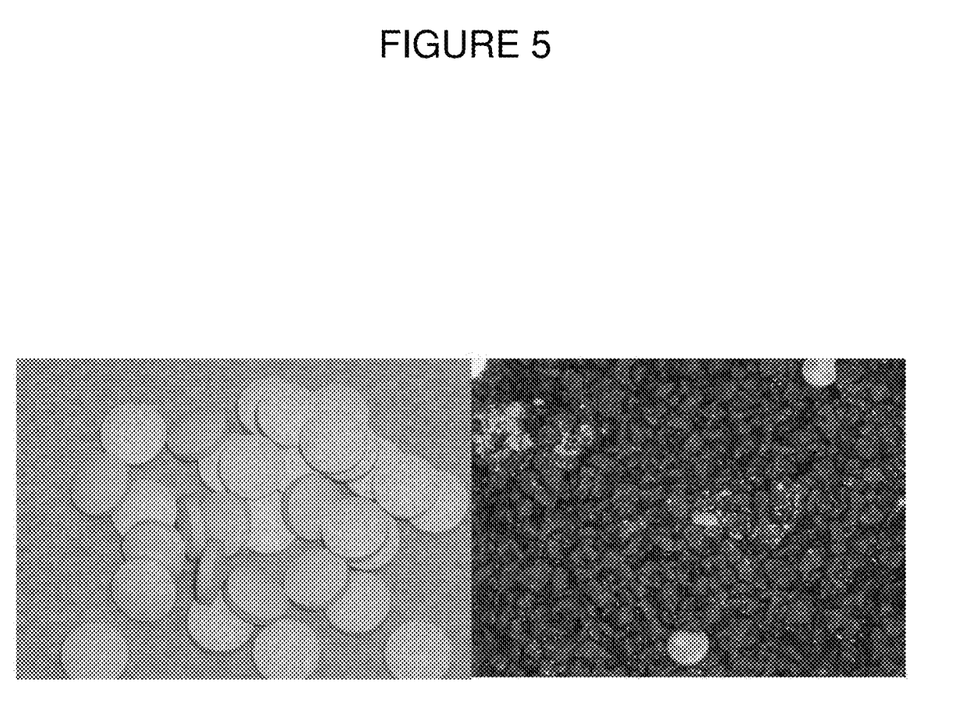
FIG. 5 shows two photographs of example CHA-based tablets, and their appearance in a wet food product after undergoing a retort cycle.

FIG. 5, left hand side, illustrates actually manufactured CHA-matrix tablets having a medium relative hardness, according to the recipe noted above, whilst the right hand side of FIG. 5 shows a commercial 'meat chunks in gravy' food product, which includes soft or chewy food components in a gravy as well as a number of solid and crunchy tablets, after being retorted. This photo shows that the tablets maintain their shape-integrity and have not been disintegrated or substantially softened as consequence of retorting in an aqueous environment. Subsequent to shelf-life storage, the multi-component food product showed almost unchanged characteristics, i.e. in the finished multi-component food product, the shape integrity of the hard tabletted pieces was maintained and the textural quality met the requirements for crunch and for crisp wet metrics required for such products in the marketplace.

The invention claimed is:

1. A sterilized, multi-component packaged food product, including at least a first component and a second component in contact with, and visible within, the first component, wherein said first component is a substantially water-based, liquid, pasty or gelled food, and wherein the second component is one or more relatively hard, manufactured pieces, each piece including a matrix of inorganic material including calcium mineral salts.

2. The multi-component packaged food product of claim 1, wherein the pieces of the second component have an initial moisture content of less than 10.0% w/w prior to incorporation into said first component.

3. The multi-component packaged food product of claim 1, wherein prior to thermal processing, the difference in water activity between said first component and said pieces of the second component is in the range 0.10 to 0.20.

4. The multi-component packaged food product of claim 1, wherein the first component has a water activity of at least 0.9.

5. The multi-component packaged food product of claim 1, wherein the pieces of the second component pieces are compressed calcium mineral salts.

6. The multi-component packaged food product of claim 1, wherein the matrix of inorganic material includes a matrix of calcium hydroxyapatite.

7. The multi-component packaged food product of claim 6, wherein the solid phase pieces include one or more materials selected from the group consisting of nutraceutical actives, pharmaceutical actives, vitamins, functional minerals, dentifrices and chelating agents.

8. The multi-component packaged food product of claim 6, wherein the pieces include palatant substances incorporated therein or present thereon.

9. The multi-component packaged food product of claim 6, wherein the calcium hydroxyapatite is formulated and manufactured by dry blending of tri-calcium phosphate (TCP), calcium hydroxide (CH) and calcium sulphate (CS) in a ratio of about 2TCP:1CH:1CS, subsequent addition of water and appropriate titration and neutralization using a food-grade acid to an about neutral pH value, followed by optional conditioning of the resulting slurry prior to drying and granulating.

10. A sterilized, multi-component packaged food product, including at least a wet phase component and a plurality of solid phase pieces, wherein said wet phase component consists of a wet phase comprising water and other edible substances and having a water activity of above 85 and which at ambient temperature has a liquid, viscous or gelled consistency, and wherein said solid phase pieces are at least partially surrounded by, and visible within, the wet phase component and include a manufactured matrix of inorganic and edible mineral salts having a bulk water activity value of 0.75 or below prior to thermal processing of the packaged food product.

11. The multi-component packaged food product of claim 10, wherein the solid phase pieces have an initial moisture content of less than 10.0% w/w prior to incorporation into said wet phase component.

12. The multi-component packaged food product of claim 10, wherein prior to thermal processing, the difference in water activity between said wet phase component and said solid phase pieces is in the range 0.10 to 0.20.

13. The multi-component packaged food product of claim 10, wherein the wet phase component has a water activity of at least 0.9.

14. The multi-component packaged food product of claim 10, wherein the solid phase pieces are compression tablets.

15. The multi-component packaged food product of claim 10, wherein the solid phase pieces include a matrix of inorganic material including calcium mineral salts.

16. The multi-component packaged food product of claim 15, wherein the calcium mineral salts include calcium hydroxyapatite.

17. The multi-component packaged food product of claim 16, wherein the solid phase pieces include one or more materials selected from the group consisting of nutraceutical actives, pharmaceutical actives, vitamins, functional minerals, dentifrices and chelating agents.

18. The multi-component packaged food product of claim 16, wherein the pieces include palatant substances incorporated therein or present thereon.

19. The multi-component packaged food product of claim 16, wherein the calcium hydroxyapatite is formulated and manufactured by dry blending of tri-calcium phosphate (TCP), calcium hydroxide (CH) and calcium sulphate (CS) in a ratio of about 2TCP:1CH:1CS, subsequent addition of water and appropriate titration and neutralization using a food-grade acid to an about neutral pH value, followed by optional conditioning of the resulting slurry prior to drying and granulating.

* * * * *